(No Model.) 3 Sheets—Sheet 3.
L. HACHENBERG.
SCALE.
No. 605,638. Patented June 14, 1898.
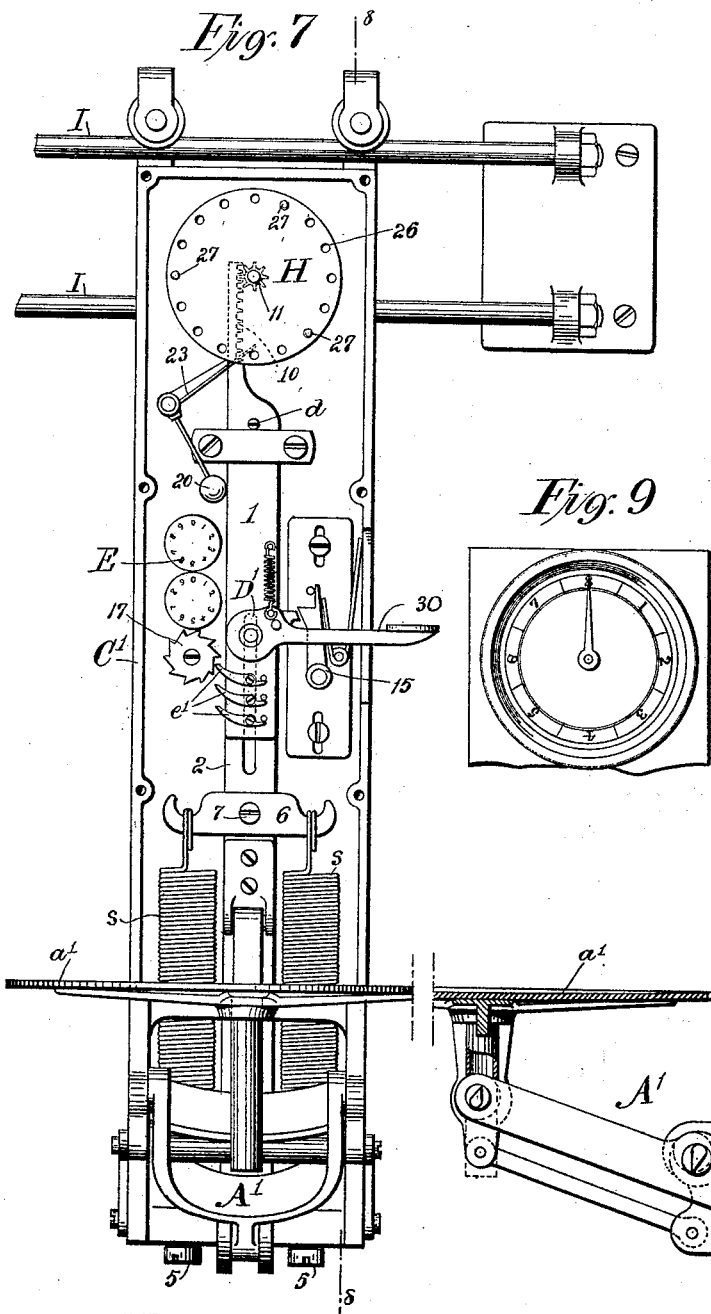
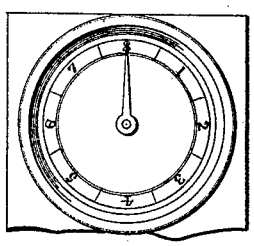
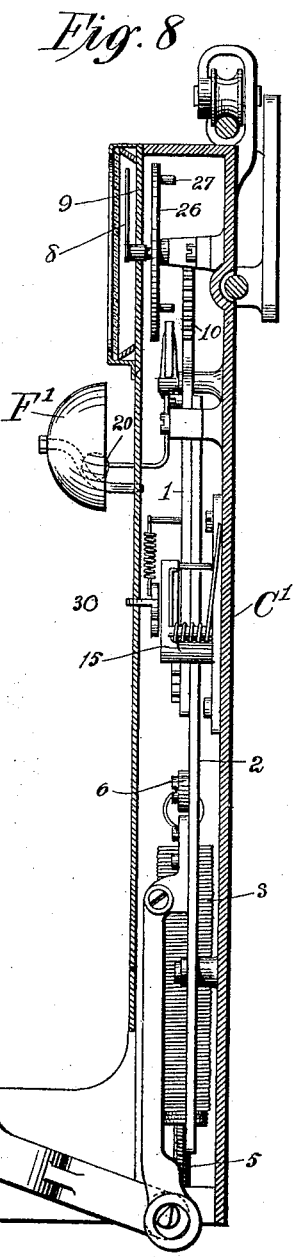
WITNESSES:
Bertram H. Saunders
Eugenie A. Prosides
INVENTOR:
Louis Hachenberg
BY A. Faber du Faur
ATTORNEY.

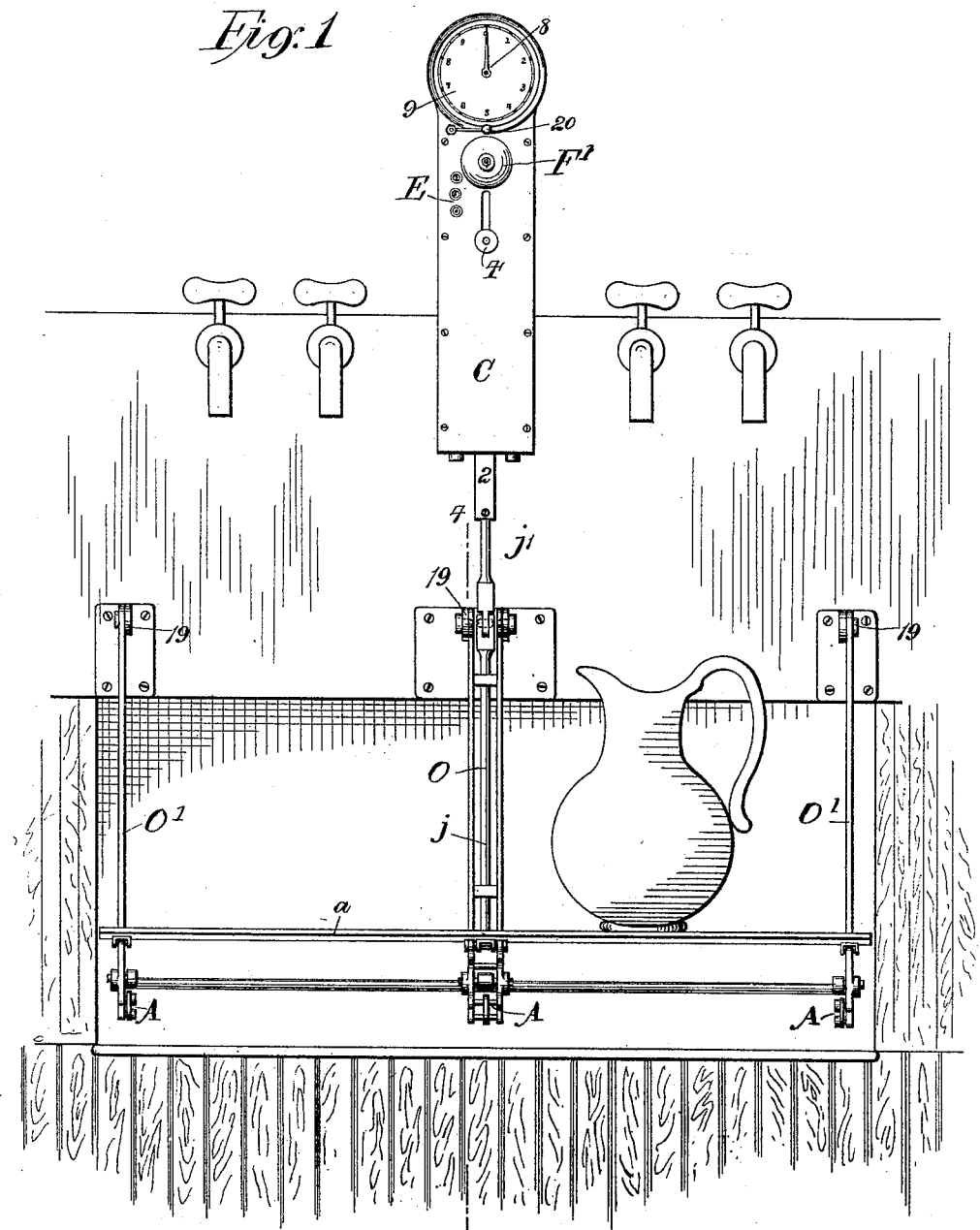

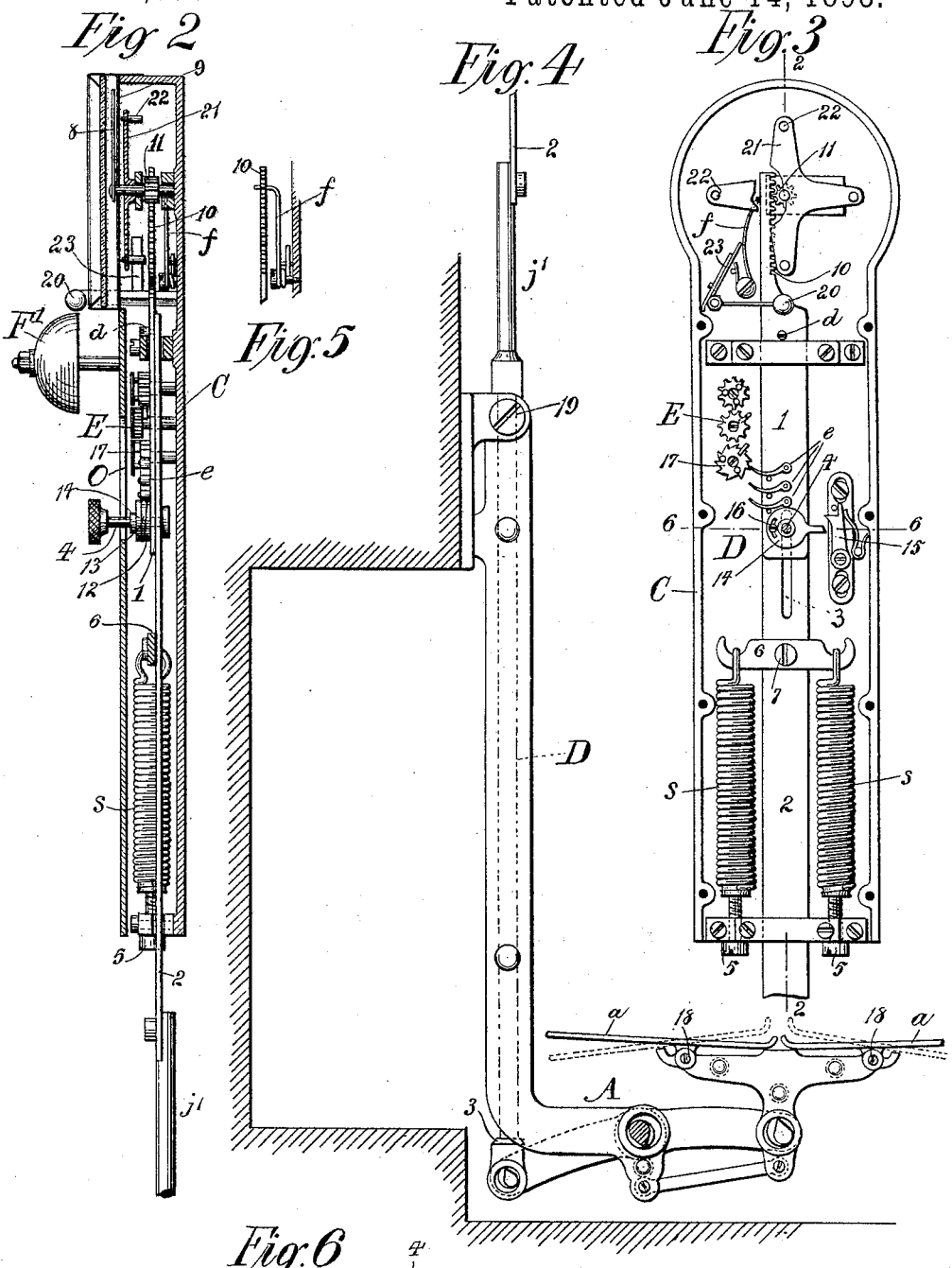

UNITED STATES PATENT OFFICE.

LOUIS HACHENBERG, OF NEW YORK, N. Y., ASSIGNOR TO EDWARD F. WATTSON AND LAWSON SANDFORD, OF SAME PLACE.

SCALE.

SPECIFICATION forming part of Letters Patent No. 605,638, dated June 14, 1898.

Application filed November 16, 1896. Serial No. 612,177. (No model.)

*To all whom it may concern:*

Be it known that I, LOUIS HACHENBERG, a citizen of the United States of America, and a resident of New York, in the county and State of New York, have invented certain new and useful Improvements in Scales, of which the following is a specification.

My invention has reference to improvements in scales, and particularly to a spring-scale in which the weight of the receptacle placed on the pan or platform does not influence the ultimate indications of the scale, the scale indicating only the actual weight of the substance introduced into the receptacle.

My invention consists, essentially, in a weighing apparatus comprising an indicating device, a support for the body to be weighed, a connecting-rod intermediate of the support and the indicating device, and made in two sections slidably connected, one of said sections being placed in operative connection with the indicating device and the other in connection with the support, means for locking said sections, and a device arranged to engage with said means for locking the sections to automatically unlock the same when the body is removed from the scale.

The nature of my invention will best be understood when described in connection with the accompanying drawings, in which—

Figure 1 represents a front elevation of a scale embodying my invention adapted for weighing beer or other liquids. Fig. 2 is a vertical section on the line 2 2, Fig. 3. Fig. 3 is an elevation on an enlarged scale with the front of the casing removed. Fig. 4 is a vertical section on the line 4 4, Fig. 1, of the lower portion of the scale. Figs. 5 and 6 are sectional details. Fig. 7 is a front elevation of a modified form, the front of the casing being removed. Fig. 8 is a vertical section on the line 8 8, Fig. 7. Fig. 9 is a face view of the dial.

Similar letters and numerals of reference designate corresponding parts throughout the several views of the drawings.

Referring at present to Figs. 1 to 4, the letters *a a* designate two scale-pans supported upon a lever system A of any suitable construction, adapted to impart an upward movement to a rod extending upwardly into the casing C, said system being in this instance placed in connection with said rod by links *j* and *j'*. This rod is made with two overlapping sections 1 and 2, slidably arranged and connected. The section 2 is provided with a longitudinal slot 3, Fig. 3, at its upper end, through which passes the bolt 4 of a locking device D, adapted to lock and unlock the two sections of the rod, thereby causing the same either to act as a unit or to permit sliding motion of the section 2 with respect to the section 1. On opposite sides of rod-section 2 are arranged the two scale-springs *s s*, having their lower ends attached to regulating-screws 5 5 for properly adjusting the tension and their upper ends to a cross-head 6, which is pivoted at 7 to the section 2, so that it can turn on the upward movement of the rod to provide for inequalities in the tension of the springs.

The upper end of the rod-section 1 is placed in connection with a suitable dial-hand 8, arranged in front of a dial 9. This connection may be effected by a rack 10 on the upper end of the section 1 and a pinion 11 on the arbor of the hand. A spring *f* holds the rack against the pinion. The downward motion of the section 1 is limited by a stop *d*, which is in proper position to return the hand to zero. The device D for locking and unlocking the sections 1 and 2 of the rod B, I have in this instance shown as operated from the front of the scale and to consist of the before-mentioned bolt 4 and two cam-disks 12 and 13, the one being attached to the section 1 and the other to the bolt 4, Fig. 6. By turning the bolt to the right the overlapping portions of the two sections are wedged together, and vice versa.

When a pitcher or other receptacle is placed on the scale-pans while the sections 1 and 2 are unlocked, the section 2 will move upwardly against the action of the springs *s s* until the weight of the receptacle is compensated for. The bolt 4 is then turned by hand to fasten the sections 1 and 2 together. As before described, the sections 1 and 2 move together with the introduction of the liquid or other matter to be weighed, and the weight is indicated on the dial. After the removal of the receptacle and contents the bolt 4 is turned by suitable means to automatically effect the unlocking of the sections. Said means consist of a trip 14, connected with the cam 13 and adapted to be engaged by a spring-pressed pawl 15, attached to the casing. As the parts move upward the trip 14 passes the pawl; but on the descent of the trip it is engaged by the pawl and turned to effect the separation of the sections. In practice I make the trip adjustable by a pin 16 and slot connection with one of the cams, and also adjustably mount the pawl so that the parts can be adjusted for wear and the release effected as near as possible to the end of the downward stroke.

If the number of pounds is to be registered, I make use of a counter of any usual construction, which is operated from the upper section 1. In the present example I have shown the units-ratchet 17, adapted to be engaged by gravitating-pawls e, arranged one above the other on the section 1. As the pawls successively engage the ratchet-wheel 17 the counter is advanced. In the present instance I have shown three pawls, each of which will advance the counter through two and one-half pounds.

To give audible indications of the weights, I provide a sounding device, which may consist of a gong F', the hammer 20 of which is vibrated at each pound or at each predetermined number of pounds. In the present instance I have shown a wheel 21, mounted on the arbor of the dial-hand and provided with four pins 22, adapted to engage successively with the flexible lever-arm 23 of the sounder, and so ring up each two and one-half pounds.

As the present apparatus is more especially intended for weighing liquids, I prefer to arrange the scale-pans to tilt so as to discharge the spilled liquid by pivoting the said pans, as at 18, Fig. 3, and overbalancing the same, so that when the receptacle is removed they will turn to the positions shown by dotted lines in Fig. 3. To swing the lever system and pans out of the way, the scale-frames O and O' may be hinged, as at 19.

In the construction shown in Figs. 7, 8, and 9 the same principle is embodied, differences being merely in the details of construction. I make use of but one scale-pan a', which is of a usual form and the lever system of which is, as before, connected to the rods 1 2. The locking device D' for the two sections 1 2 of the rod is arranged to be operated by a spring-lever 30, extending to one side of the casing C'. The spring balances the weight of the lever and so holds the rod-sections unlocked. After the receptacle is weighed the lever is depressed and the sections are locked thereby. For striking off the pounds I employ a wheel H, provided with a concentric series of holes 26, corresponding to the half-pounds. Into these holes are inserted pegs 27, which engage the lever-arm 23 of the hammer. In this manner the gong can be made to successively sound any desired weight. I have also in this instance shown the scale suspended from overhead rails I, so that it can be slid from one faucet to another. The gong and counter may be omitted, if desired.

It is evident that my invention can be embodied in many different forms of scales. Therefore I do not wish to restrict myself to the form shown or to the details of construction involved.

What I claim as new is—

1. A weighing apparatus comprising an indicating device, a support for the body to be weighed, a connection intermediate of said support and the indicating device made in two sections slidably connected to permit motion of the section in connection with the support without imparting motion to the indicating device, means for locking said sections together by hand, and means adapted to engage with the locking means for automatically unlocking the same when the weighed body is removed from the support and the connection between the support and the indicating device moves upwardly, substantially as described.

2. A weighing apparatus comprising an indicating device, a support for the body to be weighed, a connecting-rod intermediate of the support and the indicating device and made in two sections slidably connected to permit motion of the section in connection with the support without imparting motion to the indicating device, means for locking said sections together by hand, means adapted to engage with said locking means for automatically unlocking the same when the weighed body is removed from the support, a stop for the section in connection with the indicating device for determining the zero position of the hand, a counter, and an operative connection between the rod-section in connection with the indicating device and said counter, substantially as described.

3. A weighing apparatus comprising an indicating device, a support for the body to be weighed, a connecting-rod intermediate of the support and the indicating device and made in two sections slidably connected to permit motion of the section in connection with the support without imparting motion to the indicating device, means for locking said sections together by hand, means adapted to engage with said locking means for automatically unlocking the same when the weighed body is removed from the support, a stop for the section in connection with the indicating device for determining the zero position of the hand, a counter, a sounding device, and operative connections between the rod-section in connection with the indicating device and said counter and sounding device, substantially as described.

4. A weighing apparatus comprising an indicating device, a support for the body to be weighed, a connection intermediate of said support and the indicating device made in two sections slidably connected to permit motion of the section in connection with the support without imparting motion to the indicating device, means for locking said sections together by hand, means arranged across the path of said locking means for unlocking the same when the weighed body is removed from the support, a cross-head pivoted to the section in connection with the support, and springs attached to a fixed part of the apparatus and to said cross-head, substantially as described.

5. A weighing apparatus comprising an indicating device, a support for the body to be weighed, a connecting-rod intermediate of the support and the indicating device and made in two sections slidably connected to permit motion of the section in connection with the support without imparting motion to the indicating device, means for locking said sections and for automatically unlocking the same, and a stop for the section in connection with the indicating device for determining the zero position of the hand, substantially as described.

6. A weighing apparatus comprising an indicating device, a pan or platform, a connecting-rod intermediate of the pan or platform and the indicating device and made in sections slidably connected, and a locking and unlocking device for the rod-sections composed of a cam adapted to press the sections together, and a pawl adapted to engage with said cam on the descent of the connecting-rod, substantially as described.

7. A weighing apparatus comprising an indicating device, a pan or platform, a connecting-rod intermediate of the pan or platform and the indicating device and made in sections slidably connected, means for locking and unlocking said sections, a disk provided with sockets, a pin or pins adapted to be inserted in said sockets, a sounding device adapted to be engaged by said pins, and an operative connection between the upper rod-section and said disk, substantially as described.

In testimony that I claim the foregoing as my invention I have signed my name, in presence of two witnesses, this 31st day of August, 1896.

LOUIS HACHENBERG.

Witnesses:
 EUGENIE A. PERSIDES,
 A. FABER DU FAUR, Jr.